United States Patent
McClenahan et al.

(10) Patent No.: US 10,728,169 B1
(45) Date of Patent: Jul. 28, 2020

(54) INSTANCE UPGRADE MIGRATION

(71) Applicant: AMAZON TECHNOLOGIES, INC., Seattle, WA (US)

(72) Inventors: Weili Zhong McClenahan, Seattle, WA (US); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1189 days.

(21) Appl. No.: 14/751,976

(22) Filed: Jun. 26, 2015

(51) Int. Cl.
*H04L 12/911* (2013.01)
*H04L 12/24* (2006.01)

(52) U.S. Cl.
CPC .......... *H04L 47/783* (2013.01); *H04L 41/082* (2013.01)

(58) Field of Classification Search
CPC combination set(s) only.
See application file for complete search history.

(56) References Cited

U.S. PATENT DOCUMENTS

| | | | |
|---|---|---|---|
| 2006/0200819 A1* | 9/2006 | Cherkasova | G06F 9/45533 718/1 |
| 2013/0326514 A1* | 12/2013 | Jeon | G06F 9/45504 718/1 |
| 2016/0259660 A1* | 9/2016 | Gaurav | G06F 9/45558 |

* cited by examiner

*Primary Examiner* — Philip J Chea
*Assistant Examiner* — Mohammed Ahmed
(74) *Attorney, Agent, or Firm* — Blank Rome LLP

(57) ABSTRACT

A system comprising a computing node comprising a processor and a non-transitory memory and an application stored in the non-transitory memory. When executed by the processor, the application causes the processor to receive an input requesting that a first compute instance of a first compute instance type be instantiated as a second compute instance of a second compute instance type, where a mix of compute resources associated with the second compute instance type is different from a mix of compute resources associated with the first compute instance type; create the second compute instance of the second compute instance type based on the first compute instance; deactivate the first compute instance; and instantiate the second compute instance.

20 Claims, 7 Drawing Sheets

INSTANCE UPGRADE MIGRATION

BACKGROUND

The recent revolution in technologies virtualizing hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacturing and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide processing resources in the form of compute instances, for example virtual machine instances. As another example, virtual computing resources may provide storage in the form of block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. The compute instance that is logically coupled to (e.g., attached to) one or more volumes of block-based storage doesn't know or care where the physical compute resources that provide the block-based storage are located, and this physical decoupling may provide flexibility for the compute instances.

BRIEF DESCRIPTION OF THE DRAWINGS

For a detailed description of various examples, reference will now be made to the accompanying drawings in which.

DETAILED DESCRIPTION

Figure 1:
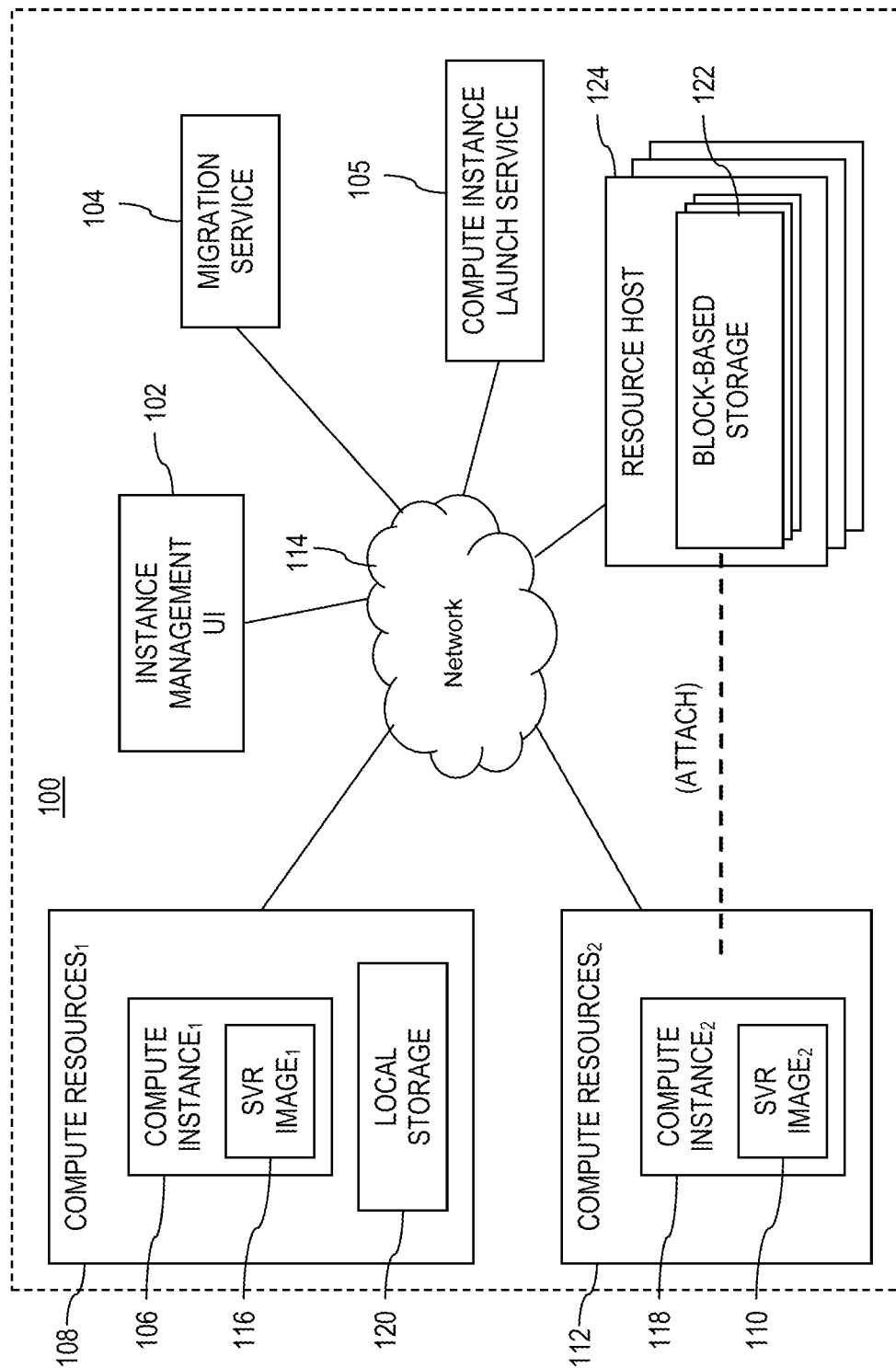
FIG. 1 shows a computer system for migrating compute instances in accordance with various examples.

A computing service provider may offer cloud computing services to customers who are able to purchase the use of computing and storage resources from the service provider on a relatively instantaneous as-needed basis. Some of these resources may be provided in the form of compute instances executing on compute resources (e.g., physical servers and other hardware and software elements). The compute instances may be configured and executed on compute resources that are determined by a compute instance type associated with the compute instance. Over time new types of compute instances become available, and a customer might desire to change the customer's current compute instances of an older compute instance type to compute instances of the new compute instance types that become available. Said in other words, the customer may desire to migrate computing tasks performed by one or more compute instances of a legacy compute instance type to corresponding compute instances of a different compute instance type. For example, some service provider customers may have compute instances that were created based on 10-year old compute instance types. These customers may be reluctant to change their compute instances to a later or upgraded compute instance type because they worry that the instance type change-over process may be time consuming, may result in excessive downtime, and/or may provide poor service to users during a transition time. The present disclosure addresses these issues by providing a migration system that permits a customer to change the customer's instance types during a migration process of the instance. The disclosed compute instance type migration system provides convenience, reduced downtime, and a better user experience.

Computing needs may be supported by compute instances executing on compute resources that may comprise physical servers, main memory, mass storage, network connectivity, and other computing hardware and software resources. In some contexts, compute instances may be referred to as virtual machines. These compute instances may execute in a virtualization context or framework (e.g., in the context of a hypervisor) that abstracts the physical compute resources and provides the compute instance with a logical interface to the underlying physical compute resources.

Compute instances may be created based on and/or executed on compute resources determined by various different compute instance types. Compute instance types may differ from one another by a mix of compute resources or a balance of compute resources provided as virtualized compute resources to compute instances of the subject instance types. For example, one compute instance type may provide underlying compute resources having a mix or balance of capabilities that support applications that perform aggressive processing and/or intense number crunching. A different compute instance type may provide underlying compute resources having a mix or balance of capabilities that support applications that perform modest processing but demand quicker input/output response time. The underlying compute resources provided by different compute instance types may differ with reference to the power of central processing units (CPUs) resources provided, whether one or more graphics processing unit (GPUs) are provided, the amount or type of random access memory (RAM) or main memory provided, and/or the amount or type of storage (i.e., non-volatile disk drive data storage on magnetic or solid state media) provided as underlying compute resources to the compute instances of the subject compute instance type. In some cases, compute instance types may differ based on the scale of hardware resources provided by a compute resource underlying a compute instance of the subject compute instance type. For example, a first compute instance type may be associated with hardware resources that are two, four, or eight times the hardware resources of another compute instance type.

The underlying compute resources provided by different compute instance types may differ with reference to whether storage is fully redundant, supports rapid recovery, is geographically redundant, and the like. Some compute instance types may support burstable processing while other compute instance types do not support burstable processing. Burstable processing allows a compute instance to use extra CPU processing (e.g., more than the standard volume of CPU processing supported for the given compute instance type) for transient periods of time, when the compute instance on average uses less than the standard volume of CPU processing. The compute instance type may further determine other aspects, for example a pricing policy applied to the compute instance and/or support for rapidly expanding and contracting the underlying compute resources allocated to the compute instance. The instances described herein execute in a virtualization context or framework that compute instances use to access physical compute resources via logical interfaces provided by the virtualization context.

The disclosed system permits one or more compute instances of a customer to be migrated from one physical machine to another physical machine (e.g., from one collection of compute resources to a different collection of compute resources), while also permitting, as desired and selected by the customer, the compute instances type of the compute instances to be changed. A first compute instance (referred to as a source compute instance) may be migrated from a first compute instance type to a second compute instance (referred to as a target compute instance) of a second compute instance type. While descriptions below may refer to both a single source compute instance and a single target compute instance, in actual practice a plurality of source and/or target compute instances may be involved in compute instance migrations. In some embodiments, the number of source compute instances may differ from the number of target compute instances. For example, 20 source compute instances of a first compute instance type may be migrated to 4 target compute instances of a second compute instance type, for example when the compute resources associated with the second compute instance type are more powerful or more efficient than those of the first compute instance type. A compute instance migration service may determine the number of target compute instances that are estimated to provide service at least substantially equivalent to the source compute instances, based on the source compute instance type and based on the target compute instance type, and instantiate the appropriate number of target compute instances accordingly. The compute instance type migration system provides convenience, reduced downtime, and a better user experience. By switching compute instances of older, legacy compute instance types to compute instances of newer, upgraded compute instance types customers may save money and enjoy increased computing efficiency.

Migration of compute instances may be more or less complicated depending on the source compute instance type. For example, some legacy compute instance types may utilize local block-based storage, and some upgrade compute instance types may not support local block-based storage and instead may mandate utilization of remote block-based storage. Local block-based storage may be storage that is on the physical server on which the subject compute instance executes (e.g., installed in the same rack as the physical server). By contrast, remote block-based storage may comprise storage that is physically remote from the compute resources (e.g., underlying physical server) of the corresponding compute instance and that is provided by a block storage service. In some cases, migrating source compute instances from a legacy compute instance type to target compute instances of an upgrade compute instance type may entail copying the data stored in the local block-based storage used by the source compute instances to one or more volumes of remote block-based storage. In one mode of compute instance migration, during the migration process the source compute instances of the legacy compute instance type may be deactivated to stop writing to the local block-based storage. In addition to the deactivated compute instance stopping writing to local block-based storage, the deactivated compute instance may stop processing inputs and outputting results. A remote block-based storage resource may be allocated, and the data may be copied to the remote block-based storage resource from the local block-based storage. Once all data is copied to the remote block-based storage, the new compute instances of the upgrade compute instance type are instantiated on behalf of the customers. In some contexts, a remote block-based storage resource may be referred to as a virtualized non-local block-based storage resource. In some contexts, the remote block-based storage resource may be referred to as an elastic block storage resource or as an elastic block storage service.

A server image associated with the deactivated source compute instance of the legacy compute instance type may be converted to a server image associated with the upgrade compute instance type. A server image, as used herein, may be conceptualized as a template for creating or instantiating a compute instance. A server image may comprise instructions that can be loaded into a main memory of a compute resource (a physical server) or on top of a hypervisor and then executed to provide the functionality of a virtual server. One or more target compute instances of the upgrade compute instance type may be activated and/or instantiated based on the converted server image. The remote block-based storage resource may be attached to the newly activated target compute instances of the upgrade compute instance type, whereby the source compute instances have been migrated from the legacy compute instance type to target compute instances of the upgrade compute instance type, and the processing of a client application may continue. By contrast, if the legacy compute instance type is already using the remote block-based storage, the source compute instances of the legacy compute instance type may be deactivated, the remote block-based storage resource attached to the source compute instances of the legacy compute instance type may be detached, the target compute instances of the upgrade compute instance type may be activated, and the remote block-based storage resource may be attached to the activated target compute instances of the upgrade compute instance type.

Server images may be of different types, for example a paravirtualization (PV) server image type or a hardware-assisted virtual machine (HVM) server image type. PV server images provide virtualization without central processing unit (CPU) or hardware support for virtualization execution. PV is lightweight in comparison to HVM, which typically involves significant processing overhead due to overhead at the hardware level. PV, however, provides less abstraction of the underlying compute resources. This may entail patching of a guest operating system kernel of the virtual server as well as patching of the underlying compute resource operating system. HVM server images provide virtualization based on CPU and/or hardware support for virtualization. HVM server images may be presented with a fully virtualized set of hardware and boot by executing the master boot record of the root block device of the server image. HVM server images provide the ability to run an operating system directly on top of a virtual machine without any modification, as if it were run on the bare-metal hardware. Unlike PV server images, HVM server images can take advantage of hardware extensions that provide fast access to the underlying hardware of the compute resources. Some compute instance types are compatible with only PV server images, and other compute instance types are compatible with only HVM server image types. Accordingly, some compute instance type migrations may further entail migrating or converting the server image from a PV server image to a HVM server image.

FIG. 1 shows a computer system 100 for migrating compute instances from a first compute instance type to a second compute instance type. In an embodiment, the computer system 100 comprises a compute instance management user interface (UI) 102, a compute instance migration service 104, a compute instance launch service 105, and a first compute instance 106 that is supported by a first collection of compute resources 108 (e.g., a collection of underlying compute resources). The migration service 104 promotes migrating the first compute instance 106 that is associated with a first compute instance type to a second compute instance 118 that is associated with a second compute instance type. The migration service 104 may execute on one or more computing nodes. The migration service 104 may execute in a compute instance executing in a virtual server on compute resources. The compute instance launch service 105 promotes launching compute instances, for example launching a compute instance of a second compute instance type or of an upgrade compute instance type on compute resources. The compute instance launch service 105 may execute on one or more computing nodes. The compute instance launch service 104 may execute in a compute instance executing in a virtual server on compute resources. The second compute instance 118 is supported by a second collection of compute resources 112 (e.g., a collection of underlying compute resources). The compute resources 108 used for the first compute instance 106 may be physically different from the compute resources 112 used for the second compute instance 118. For example, compute resources 108 and 112 may be located in different physical servers, in different equipment racks, etc.

The first compute instance type determines, at least in part, the first collection of compute resources 108 allocated for use by the first compute instance 106; and the second compute instance type determines, at least in part, the second collection of compute resources 112 allocated for use by the second compute instance 118. Said in another way, in an embodiment, a collection of compute resources (e.g., a physical server or host) is provisioned and/or configured to support one specific instance type and size. For this reason, migrating a compute instance from a first compute instance type to a second compute instance type inherently entails moving the compute instance from executing on a first collection of compute resources to a second collection of compute resources.

While the discussion herein refers to migrating a single source compute instance (i.e., the first compute instance 106) of the first compute instance type to a single target compute instance (i.e., the second compute instance 118) of the second compute instance type, the descriptions apply equally to the migration of a plurality of source compute instances of the first compute instance type to a plurality of target compute instances of the second compute instance type, to the migration of a plurality of source compute instances of the first compute instance type to a single target compute instance of the second compute instance type, and to the migration of a single source compute instance of the first compute instance type to a plurality of target compute instances of the second compute instance type. The instance management UI 102, the migration service 104, the first compute resources 108, and the second compute resources 112 may communicate through a communication network 114. The network 114 may comprise one or more public networks, one or more private networks, or a combination thereof. The network 114 may be, in part, an internal network of the service provider.

The instance management UI 102 may be used by a client (e.g., a user or customer) of a service provider to control and/or manage compute instances of the client that execute in a virtualization context supported by compute resources provided by the service provider. In some contexts, the instance management UI 102 may be referred to as a management console. The UI 102 may be provided by an application that executes on a workstation or other computer in the client environment. Alternatively, the UI 102 may be provided in a web page on a browser of a workstation or other computer operated by the client, user, or customer. To access the functions for managing the compute instances of the client, the user may log in by providing a user identity, a password, and optionally further authorization tokens. The compute instances execute on behalf of the client in a virtualization context supported by the compute resources 108, 112 provided by the service provider, for example in exchange for subscription fees paid by the client or customer to the service provider. An example of the instance management UI 102 is discussed further hereinafter with reference to FIG. 6.

The client may wish to migrate the first compute instance 106 from a current (e.g., a legacy) compute instance type to a new (e.g., an upgrade) compute instance type, for example when an upgrade compute instance type provides performance increases and/or pricing advantages relative to the legacy compute instance type. In some cases, a legacy compute instance type may be supported by older compute resource technologies that are less efficient than newer compute resource technologies supported by different compute instance types. For example, the legacy compute instance type may include slower CPUs, magnetic storage devices, etc. In some cases, the older compute resources that support the legacy compute instance types may be difficult for the service provider to maintain and support, and the service provider may desire clients to transition from compute instances of the legacy compute instance types to compute instances of an upgrade compute instance type.

When a compute instance migrates from a first compute instance type to a second compute instance type, a source compute instance is copied from a source set of compute resources to a target set of compute resources and a second instance is started. In an example of a compute instance migration, migration is accomplished by copying storage of the source compute instance to a target compute instance on the target compute resources in response to receipt of a command identifying the subject virtual machine instance and a second compute instance type. Instructions invoked by the UI 102 that execute on the compute resources 108, 112 may command the compute instance launch service 105 to select compute resources 112 for deployment of the second compute instances 118 and then launch the second compute instances 118, for example causing a hypervisor to activate the subject compute instances 118.

Part of migrating a compute instance comprises modifying network translation tables (e.g., routing tables) in accordance with the relocation of the compute instance from one collection of compute resources to a different collection of compute resources, for example from the compute resources 108 to the compute resources 112. The network translation tables may be maintained by a service provider network (e.g., the provider network 200 of FIG. 2 discussed further hereinafter) that hosts the compute resources 108, 112, 124, and other compute resources and/or services. Other services or applications executing in other compute instances may rely upon or request services provided by the first compute instance, by sending those service requests to a logical address associated with the first compute instance. The network translation tables may map logical addresses to physical addresses associated with the actual compute instances, and when a compute instance is migrated, the network translation tables may be revised to update this logical address to physical address mapping accordingly.

In an example, the first compute instance 106 may be a first compute instance type that relies upon or mandates storage that is local block-based storage 120. Local block-based storage 120 may be physically linked to the compute resources (e.g., in the same rack with a host computer on which the compute instance virtually executes) that provide the first collection of compute resources 108 on which the first compute instance 106 executes. When migrating the first compute instance 106 to the second compute instance 118 of a second compute instance type, if the second compute instance type mandates utilization of remote block-based storage 122, the data stored in the local block-based storage 120 may be copied to the remote block-based storage 122. The remote block-based storage 122 may be supported by one or more resource hosts 124. In some contexts, the remote block-based storage 122 may be managed by a block-based storage service.

Block-based storage (e.g., a logical block-based disk called a volume in some contexts) may be allocated by the block-based storage service. For example, one or more volumes of the remote block-based storage 122 may be logically allocated. The first compute instance 106 may be halted, deactivated, and/or terminated. The contents of the local block-based storage 120 may be copied to the remote block-based storage 122. The second compute instance 118 may be created as described above. The second compute instance 118 may be instantiated and the block-based storage resource may be attached to the second compute instance 118.

In another example, the first compute instance 106 may be a first compute instance type that supports a PV server image 116, while the second compute instance 118 may be a second compute instance type that supports a HVM server image 110. In this case, the PV server image 116 of the first compute instance 106 may be converted to the HVM server image 110 of the second compute instance 106, before the second compute instance 118 is created. A PV server image may be converted to an HVM server image in a variety of ways. An example PV to HVM server image conversion work flow is provided below in description related to FIG. 4, but other conversion processes are possible as well.

Figure 2:
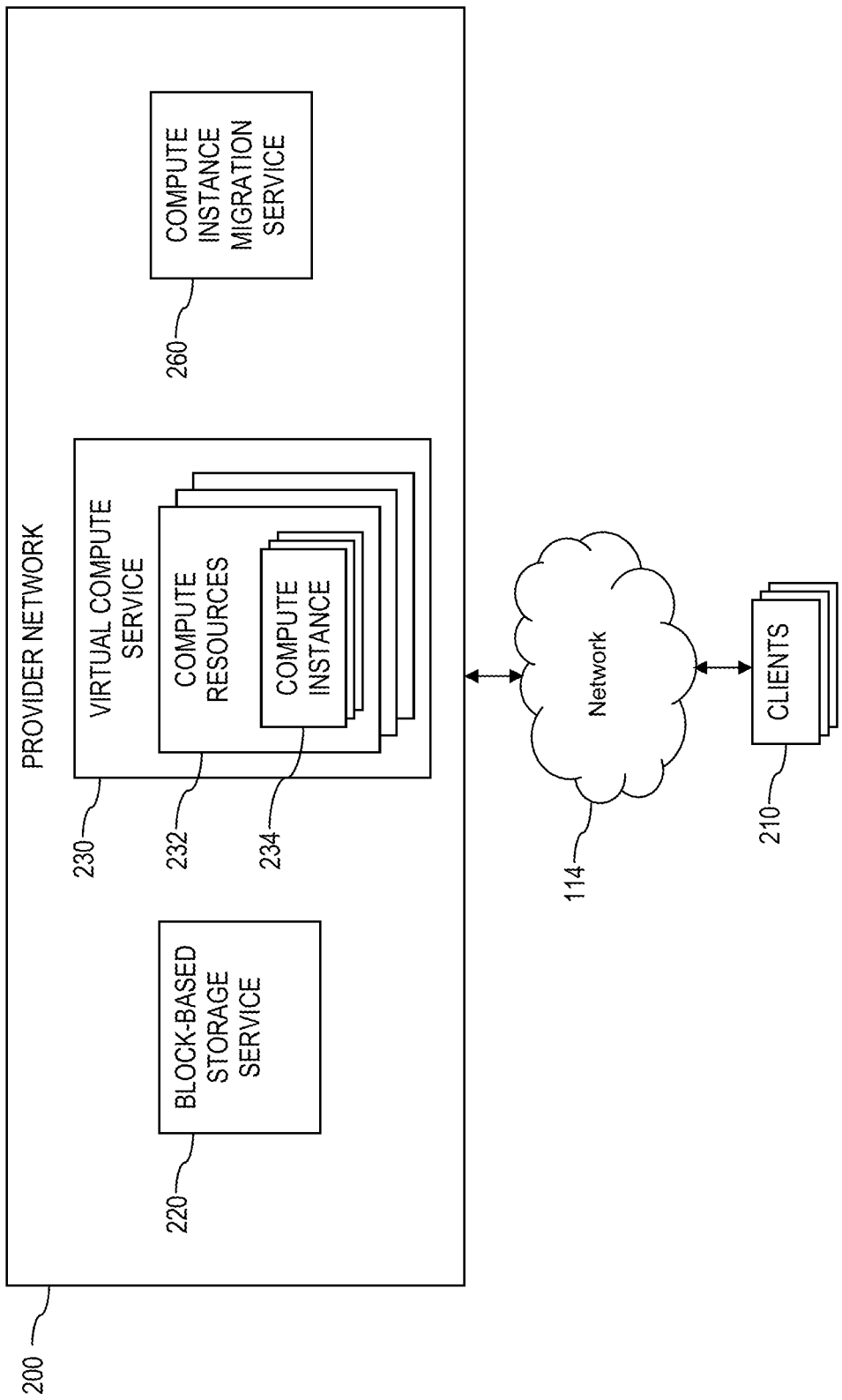
FIG. 2 shows a provider network in accordance with various examples.

FIG. 2 shows a provider network 200 implementing multiple network-based services. The provider network 200 may be set up by an entity such as a company or a public sector organization to provide one or more services (such as various types of cloud-based computing or storage) accessible via the Internet and/or other networks to clients 210. Provider network 200 may include various data centers hosting various resource pools, such as collections of physical and/or virtualized computer servers, storage devices, networking equipment, and the like (e.g., computer system 1000 described below with reference to FIG. 7), needed to implement and distribute the infrastructure and services offered by the provider network 200. In some embodiments, the provider network 200 may provide computing resources such as the block-based storage service 220, a virtual compute service 230, a compute instance migration service 260, and other services. The block-based storage service 220 may be supported in part by the block based-storage 122 and resource hosts 124. The virtual compute service 230 may be supported in part by the compute resources 108, 112. The compute instance migration service 260 may be substantially similar to the compute instance migration service 104.

Clients 210 may access these services offered by the provider network 200 via network 114. Likewise, the services 220, 230, 260 may communicate with each other via the network 114 and/or may make use of each other's services. For example, computing resources offered to clients 210 in compute instances, such as virtual servers or virtual machines, may make use of particular data volumes provided by the block-based storage service 220.

As noted above, virtual compute service 230 may offer various compute instances to clients 210. A compute instance may be supported, for example, by compute resources 232 with a specified computational capacity (which may be specified by indicating the type and number of CPUs, the main memory size, and so on) and a specified software stack (e.g., a particular version of an operating system, which may in turn run on top of a hypervisor). The size, mix, and/or balance among the underlying compute resources that are allocated to a compute instance may be referred to and/or determined by the compute instance type of the compute instance.

The compute resources 232 may comprise a number of different types of computing devices which may be used singly or in combination to implement the compute instances of the virtual compute service 230 in different embodiments, including special purpose computer servers, storage devices, network devices, and the like. In some embodiments, an instance client 210 or another user may be configured (and/or authorized) to direct network traffic to a compute instance. In various embodiments, compute instances may attach or map to one or more data volumes of the block-based storage service 220 in order to obtain persistent block-based storage for performing various operations.

Compute instances may operate or implement a variety of different platforms, such as application server instances, JAVA virtual machines (JVMs), special purpose operating systems, platforms that support various interpreted or compiled programming languages such as Ruby, Perl, Python, C, C++ and the like, or high performance computing platforms suitable for performing client applications, without for example, requiring the client 210 to access an instance. In some embodiments, compute instances have different types of configurations based on expected uptime ratios. The uptime ratio of a particular compute instance may be the ratio of the amount of time the instance is activated to the total amount of time for which the instance is reserved. Uptime ratios may also be referred to as utilizations in some implementations. If a client expects to use a compute instance for a relatively small fraction of time for which the instance is reserved (e.g., 30% to 35% of a year-long reservation), the client 210 may decide to reserve the instance as a Low Uptime Ratio compute instance and pay a discounted hourly usage fee in accordance with the associated pricing policy. If the client 210 expects to have a steady-state workload that relies on an instance being up most of the time, the client 210 may reserve a High Uptime Ratio compute instance and potentially pay an even lower hourly usage fee, depending on applicable pricing policies of the provider. An option for Medium Uptime Ratio compute instances, with a corresponding pricing policy, may be supported in some embodiments, as well, where the upfront costs and the per-hour costs may fall between the corresponding High Uptime Ratio costs and the Low Uptime Ratio costs.

Compute instance configurations may include compute instances with a general or specific purpose, such as computational workloads for compute intensive applications (e.g., high traffic web applications, ad serving applications, batch processing applications, video encoding applications, distributed analytics applications, high energy physics applications, genome analysis applications, and computational fluid dynamics), graphics intensive workloads, (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). The size of compute instances, such as a particular number of CPU cores, amount of memory, amount of cache memory, amount of storage, as well as other performance characteristics, may further be an aspect of compute instance type. Alternatively, in an embodiment, a compute instance type may comprise a plurality of sub-types that feature substantially similar balances among compute resources (CPU power, main memory size, I/O support, network resources, etc.) but which differ in scale or size of the compute resources. Configurations of compute instances may also include their location, in a particular data center, availability, geographic location, etc. In reserved compute instances, compute resource reservation term length may be a further characterization of the compute type of the compute instance.

In various embodiments, provider network 200 may also implement block-based storage service 220 for performing storage operations. The block based storage service 220 may be provided by a pool of resources hosts, for example resource hosts 124 shown in FIG. 1. Data volumes of the remote block-based storage 122 may be mapped to particular clients 210 and/or to particular compute instances 234. The remote block-based storage 122 may provide storage as a set of logical blocks. Access of compute instances 234 to block-based storage service 220 may be provided over a network internal to the provider or via the network 114.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application, or any other application that may make use of computer instances, a data volume of the block-based storage service 220, or other services supported by the provider network 200 to perform various operations. In some embodiments, such an application may include sufficient protocol support (e.g., for a suitable version of Hypertext Transfer Protocol (HTTP)) for generating and processing network-based services requests without implementing full browser support for all type of network based data. In some embodiments, clients 210 may be configured to generate network-based services requests according to a Representational State Transfer (REST)-style network-based services architecture, a document-based or message-based network-based services architecture, or another suitable network-based services architecture. In some embodiments, the client 210 (e.g., a computational client) may be configured to provide access to a compute instance or a data volume of the block-based storage service 220 in a manner that is transparent to applications implemented on the client 210 utilizing computational resources provided by the compute instance 234 or block-based storage service 220.

Clients 210 may convey network-based services requests to the provider network 200 via the network 114. In various embodiments, network 114 may comprise any suitable combination of network hardware and protocols to establish network-based communication between clients 210 and provider network 200. The network 114 may comprise a variety of communication equipment such as routers, switches, load balancers, modems, proxy servers, wireless communication nodes, and other. The network 114 may comprise software such as protocol stacks, accounting software, firewall/security software useful in providing the communication link between the client 210 and the provider network 200.

Figure 3:
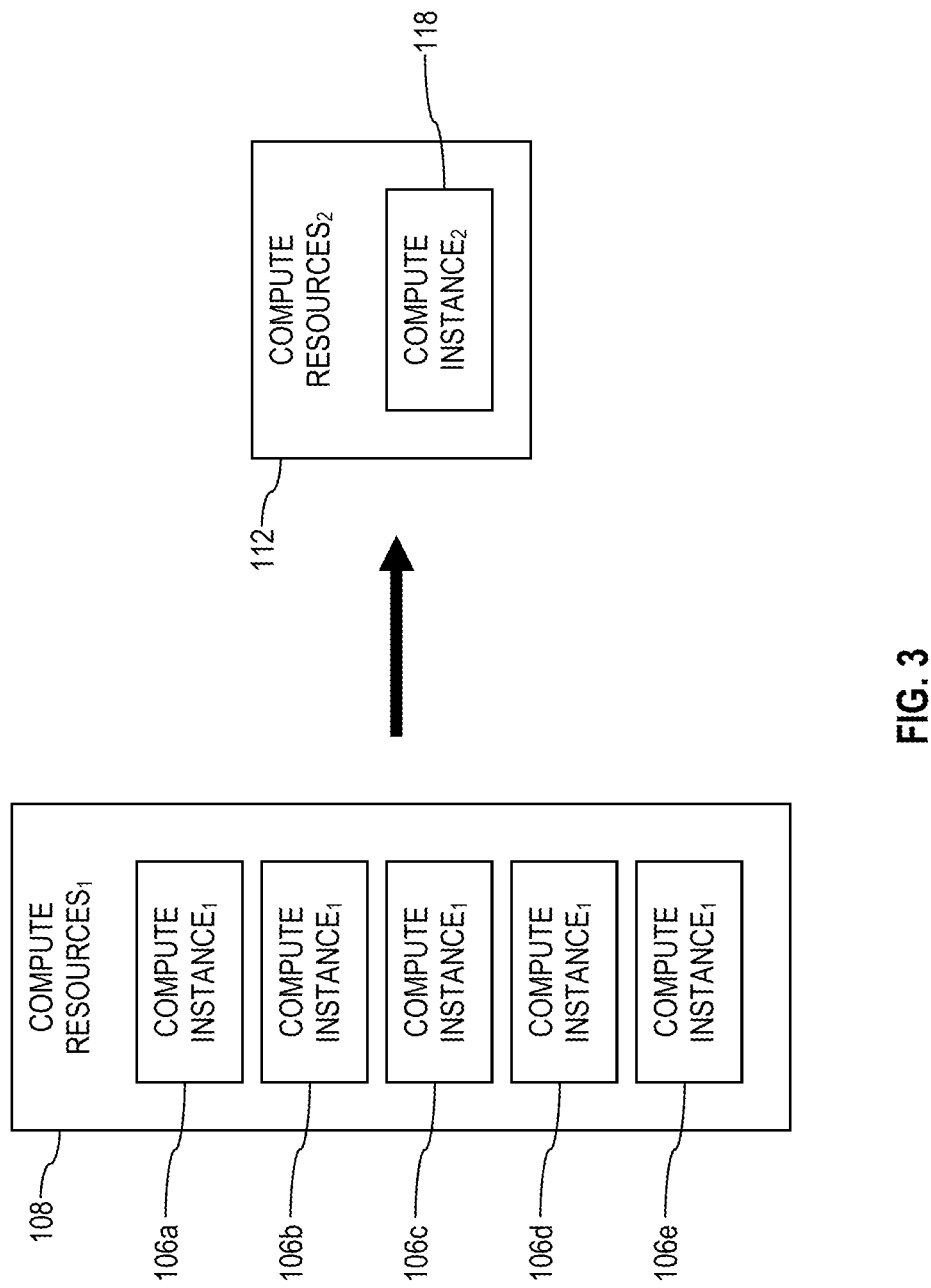
FIG. 3 shows a migration of compute instances in accordance with various examples.

FIG. 3 shows a plurality of first compute instances 106 executing in the context of the first collection of compute resources 108 associated with a first compute instance type migrated to a second compute instance 118 executing in the context of a second collection of compute resources 112 associated with a second compute instance type. This may informally be referred to as migrating the compute instances 106 from the first compute instance type to the second compute instance type. In some migration cases, the number of compute instances changes when migrating from a first compute instance type to a second compute instance type. For example, it may be that migrating 100 compute instances of a legacy compute instance type to an upgrade compute instance type results in instantiating 20 compute instances of the upgrade compute instance type. This may occur, for example, when a single compute instance of the second compute instance type executing in the context of the second collection of compute resources 112 is more powerful or more efficient than a single compute instance of the first compute instance type executing in the context of the first collection of compute resources 108.

Figure 4:
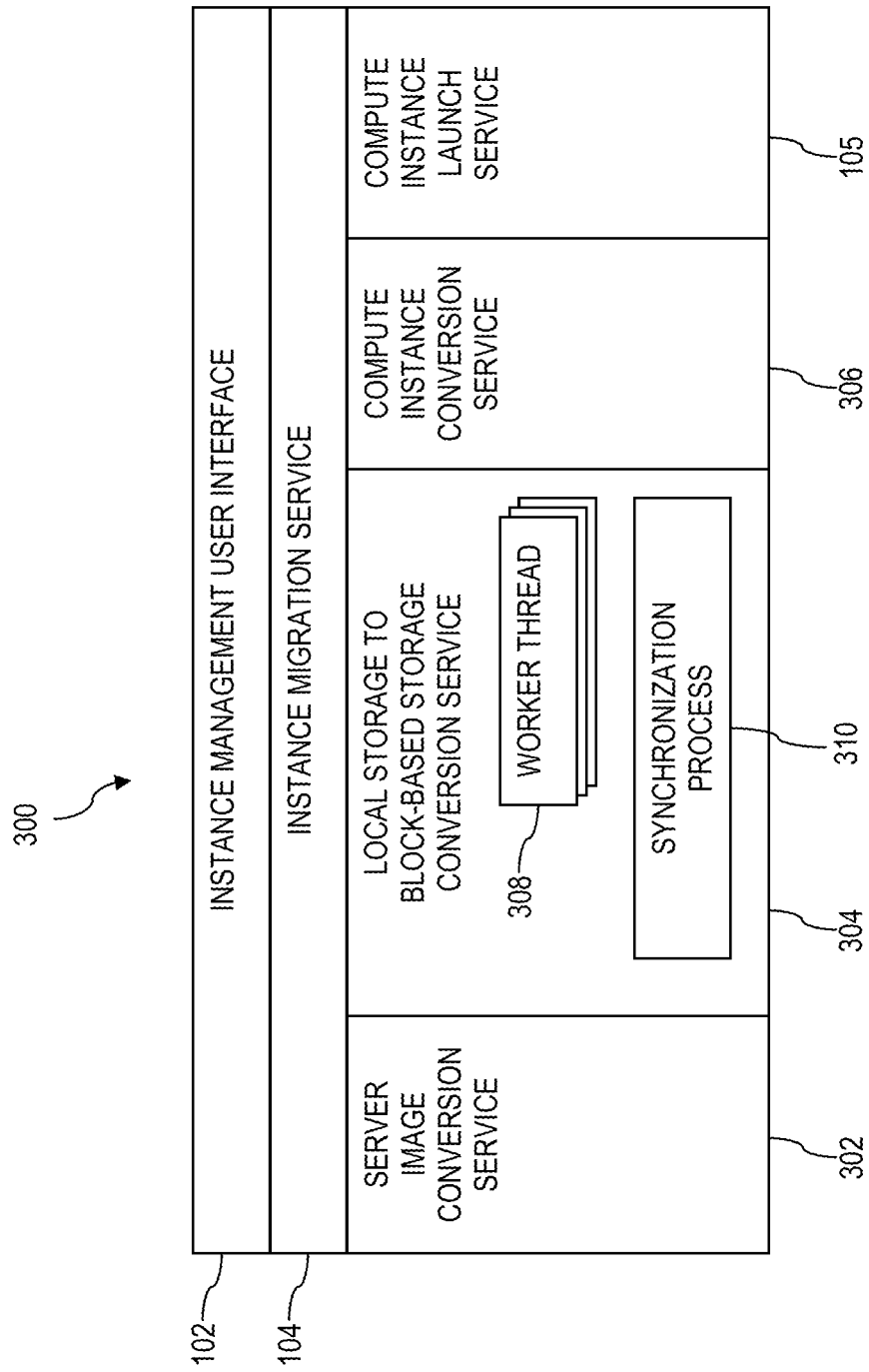
FIG. 4 shows an compute instance migration service stack in accordance with various examples.

FIG. 4 shows a service stack 300 that illustrates the compute instance migration service 104. A user or customer of the service provider may use the instance management UI 102 (or management console) to request migration of one or more compute instances from a first compute instance type to a second compute instance type. The request may be transmitted to the instance migration service 104. In turn, the instance migration service 104 may enact the user request by requesting services be performed by a lower service layer comprising, for example, a server image conversion service 302, a local block-based storage to block-based storage conversion service 304, and/or a compute instance conversion service 306.

A request input via the UI 102 to migrate a compute instance to a different compute instance type may be sent to a control plane of the compute instance migration service 104. The compute instance migration service 104 may log the command into a database of commands, a job identifier associated with the command may be assigned, and a workflow to accomplish the requested migration may be started. The compute instance migration service 104 may be said to orchestrate and/or mediate the migration in part by performing actions itself and in part by calling other services 302, 304, 306, and 105 to perform actions. The compute instance migration service 104 keeps track of the state of the workflow and coordinates with the other services in the appropriate order, providing any needed parameter values to the application programming interface (API) calls on the services.

The compute instance migration service 104 determines the compute instance type of the first compute instance 106. Based on the compute instance type of the first compute instance 106, the compute instance migration service 104 determines things about the first compute instance 106, such as does the compute instance 106 use local block-based storage or remote block-based storage? does the compute instance 106 rely upon a PV server image or a HVM server image? The answer to these questions, in combination with the identity of the selected valid target compute instance type, is used to create the migration workflow. The compute instance migration service 104 may access a list or database to determine what compute instance type migrations are valid, given the compute instance type of the first compute instance 106. Some migration combinations may be disallowed or unsupported. If the requested migration is disallowed, the compute instance migration service 104 sends a corresponding notification to the UI 102.

For the migration of compute instances, the compute instance conversion service 306 may be requested to convert the first compute instance 106 to the second compute instance 118. The compute instance conversion service 306 may take a source server image identified or provided by the instance migration service 104 and create a target compute instance based on the identified target compute instance type and based on the provided source server image. This created target compute instance then may be instantiated by the instance migration service 104 on a collection of compute resources 112 associated with the second compute instance type. During instantiation of the target compute instance (compute instance 118) the instance migration service 104 further may modify network translation tables as described further above.

In some compute instance migrations, the server image may be converted to a different type of server image. For example, the instance migration service 104 may determine that the server image of the first compute instance may be a PV server image 116 and the second compute instance type may mandate use of a HVM server image 110. In this case, the instance migration service 104 requests the server image conversion service 302 to convert the PV server image 116 to the HVM server image 110, and the instance migration service 104 creates the second compute instance 118 based on the HVM server image 110.

An example PV server image to HVM server image conversion process may comprise instructions executed by the compute instance migration service 104 that resemble the following steps.

1. The compute instance migration service 104 sends a request to the compute instance launch service 105 to start an HVM instance on a compute resource (not necessarily the target compute resource). This step may involve identifying a specific operating system to be used in the server image conversion process.

2. The compute instance migration service 104 sends a request to the compute instance launch service 105 to start a PV instance of the same operating system as used in starting the HVM instance on a compute resource (not necessarily the target compute resource).
3. Stop PV instance.
4. Detach the root partition of the PV instance.
5. Attach the PV instance root partition to the running HV instance.
6. On the HVM instance make a directory and mount to it files that support the HVM service image.
7. Rsync (e.g., copy) from a boot files source to the mounted directory.
8. Stop HVM instance.
9. Detach original root and detach PV root.
10. Attach PV root to HVM instance.
11. Start HVM instance, and the conversion from PV to HVM server image is complete.

In some compute instance migrations, the contents of storage may be copied from one location to another. For example, the instance migration service 104 may determine that the first compute instance 106 relies on a collection of compute resources 108 that employs local block-based storage 120 and the second compute instance type may mandate the use of remote block-based storage 122. In this case, the instance migration service 104 requests the local block-based storage to block-based storage conversion service 304 to allocate and copy data from the local block-based storage 120 to a block-based storage resource. In an embodiment, the storage conversion service 304 employs one or more worker execution threads 308 to copy data from the local block-based storage 120 to the block-based storage resource. The storage conversion service 304 or the instance migration service 104 may determine the number of block-based storage resources or volumes that are desired and allocate the block-based storage resources or volumes. In some cases, the local block-based storage 120 used by the first compute instance 106 may be as large as 1 terabyte of data (i.e., 1 trillion bytes) or more.

The worker threads 308 may be attached by the storage conversion service 304 to the block-based storage resources. Each worker thread 308 may copy a portion of the local block-based storage 120 to its own portion of the block-based storage resources. When complete, the worker threads 308 detach themselves from the block-based storage resources. The instance migration service then may instantiate the second compute instance 118 of the second compute instance type and attach the block-based storage resources to the second compute instance 118.

In an embodiment, the instance migration service 104 may support a live migration from the first compute instance 106 to the second compute instance 118. During a live migration, the first compute instance 106 continues to execute and be active, for example writing data to the local block-based storage 120, while the storage conversion service 304 is copying data from the local mass storage 120 to remote block-based storage 122. During a live migration, the first compute instance 106 continues to support computing needs of a client or customer, except possibly during a short transition time interval when the target compute instances take over.

When the conversion has been completed, the compute instance migration service 104 may provide the server image (or a link or pointer to the server image) to the compute instance launch service 105. The compute instance launch service 105 looks for a set of running compute resources (e.g., compute resources 112) that support the target compute instance type. The compute instance launch service 105 determines if the compute resources can support the compute instance or compute instances that are wanted by the migration. The compute instance launch service 105 may further apply additional constraints to selecting compute resources 112 for launching the target compute instance or instances, for example placement in different physical locations (different server racks, different buildings, different data centers) to promote enhanced reliability. When the compute instance launch service 105 has selected suitable compute resources 112, it launches the target compute instance or instances on the compute resources 112.

Figure 5:
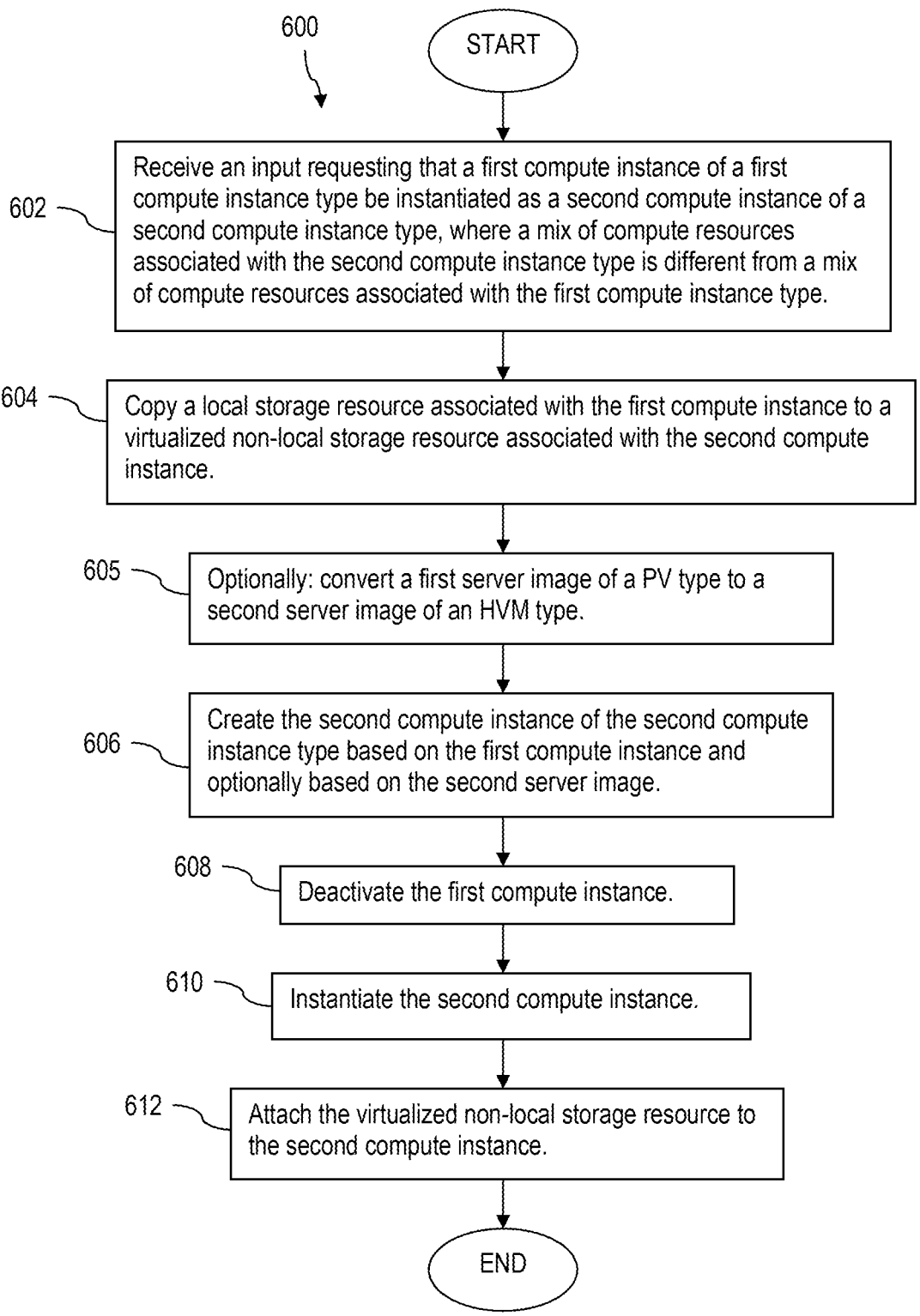
FIG. 5 shows a flow chart of a method in accordance with various examples.

FIG. 5 shows a flow chart of a method 600. The method 600 may be performed by a compute instance executing on compute resources (e.g., a compute instance implementing the compute instance migration service 104) or by an application executing on a computer system. The method 600 may be performed by the compute instance migration service 104 and/or by the compute instance migration service 104 in combination with the server image conversion service 302, the local block-based storage to block-based storage conversion service 304, and the compute instance conversion service 306. At block 602, an input is received requesting that a first compute instance of a first compute instance type be instantiated as a second compute instance of a second compute instance type, where a mix of compute resources associated with the second compute instance type is different from a mix of compute resources associated with the first compute instance type. For example, the migration service 104 receives an input from the instance management UI 102 via the network 114.

At block 604, a local block-based storage resource associated with the first compute instance is copied to a virtualized non-local block-based storage resource associated with the second computer instance. For example, one or more volumes of virtualized non-local block-based storage (e.g., block-based storage) are allocated, and data stored in the local block-based storage resource is copied to the one or more volumes of virtualized non-local block-based storage. In some circumstances the copying may take from five minutes to thirty minutes, depending on the amount of data stored in the local block-based storage. In some circumstances, copying data from local block-based storage to block-based storage may extend over a period of days and a final synchronization of data to the block-based storage, which may start after the first compute instance is deactivated or terminated, may take from five minutes to thirty minutes.

In an embodiment, one or more execution threads (e.g., the worker threads 308 described above with reference to FIG. 4) may be launched to perform the copying of data in the local block-based storage to the virtualized non-local block-based storage. In an embodiment, data may be copied from the local block-based storage resource to the virtualized non-local block-based storage resource while the first compute instance remains active and writing to the local block-based storage resource. When volumes or portions of the local block-based storage is written to after first being copied, the volume or portion may be marked as uncopied. The process of copying data from local block-based storage to virtualized non-local block-based storage (i.e., remote block-based storage) may repeatedly cycle through copying yet uncopied volumes or portions of the local block-based storage to the virtualized non-local block-based storage. When the reiteration of these copy cycles reaches a point of diminishing copy progress, the first compute instance may then be deactivated (as in block 608 described below), and the remaining volumes or portions of local block-based storage still marked uncopied are copied over to the virtualized non-local block-based storage, which may be referred to in some contexts as synchronizing the virtualized non-local block-based storage to the local block-based storage.

At block 605, optionally a first server image associated with the first compute instance (e.g., the first server image was used to instantiate the first compute instance) is converted to a second server image. The first server image may have been built as a PV server image, and the second server image may be built as a HVM server image.

At block 606, the second compute instance of the second compute instance type is created based on the first compute instance. This may involve copying a server image that was used to create the first compute instance and using that copy to create or build the second compute instance of the second compute instance type. Alternatively, the process of creating or building the second compute instance may use the same server image (e.g., the server image that was used to create or build the first compute instance is not consumed and remains in storage, for example as a file or plurality of associated files that can be referred to when creating the second compute instance). Optionally, the process of creating or building the second compute instance may use the second server image that was optionally created at block 605, by converting the first server image to the second server image. At block 608, the first compute instance is deactivated. At block 610, the second compute instance is instantiated. At block 612, the virtualized non-local block-based storage resource is attached to the second compute instance.

It is understood that while the description of the method 600 refers to migrating a single compute instance of a first compute instance type to a single compute instance of a second compute instance type, the method 600 applies equally to migrating a plurality of compute instances of the first instance type to a plurality of compute instances of the second compute instance type. The instance management UI 102, for example, may allow the client, user, or customer to identify a first number of first compute instances to migrate during a single command session. Some portions of the method 600 may be performed only once no matter how many first compute instances are migrated to no matter how many second compute instances. By contrast, other portions of the method 600 may be performed a number of times associated with the number of first compute instances or a number of times associated with the number of second compute instances.

For example, if a plurality of first compute instances are migrated, a different local block-based storage resource associated with each first compute instance may be migrated to one or more virtualized non-local block-based storage resources. Said in other words, the processing of block 604 may be repeated a number of times based on the number of first compute instances that are migrated. Alternatively, in an embodiment, a plurality of first compute instances may share the local block-based storage resource, and hence the processing of block 604 may be performed once. The processing of block 608 may be repeated the number of times equal to the number of first compute instances. The processing of blocks 606, 610, and 612 may be repeated the number of times equal to the number of second compute instances.

In an embodiment, the method 600 further comprises creating a second server image associated with the second compute instance, where the second server image is created based on a server image of the first compute instance. The second compute instances then may be instantiated in block

610 based on this second server image. The step of creating the second server image may be performed once only, independently of the number of second compute instances that are instantiated in block 610.

Figure 6:
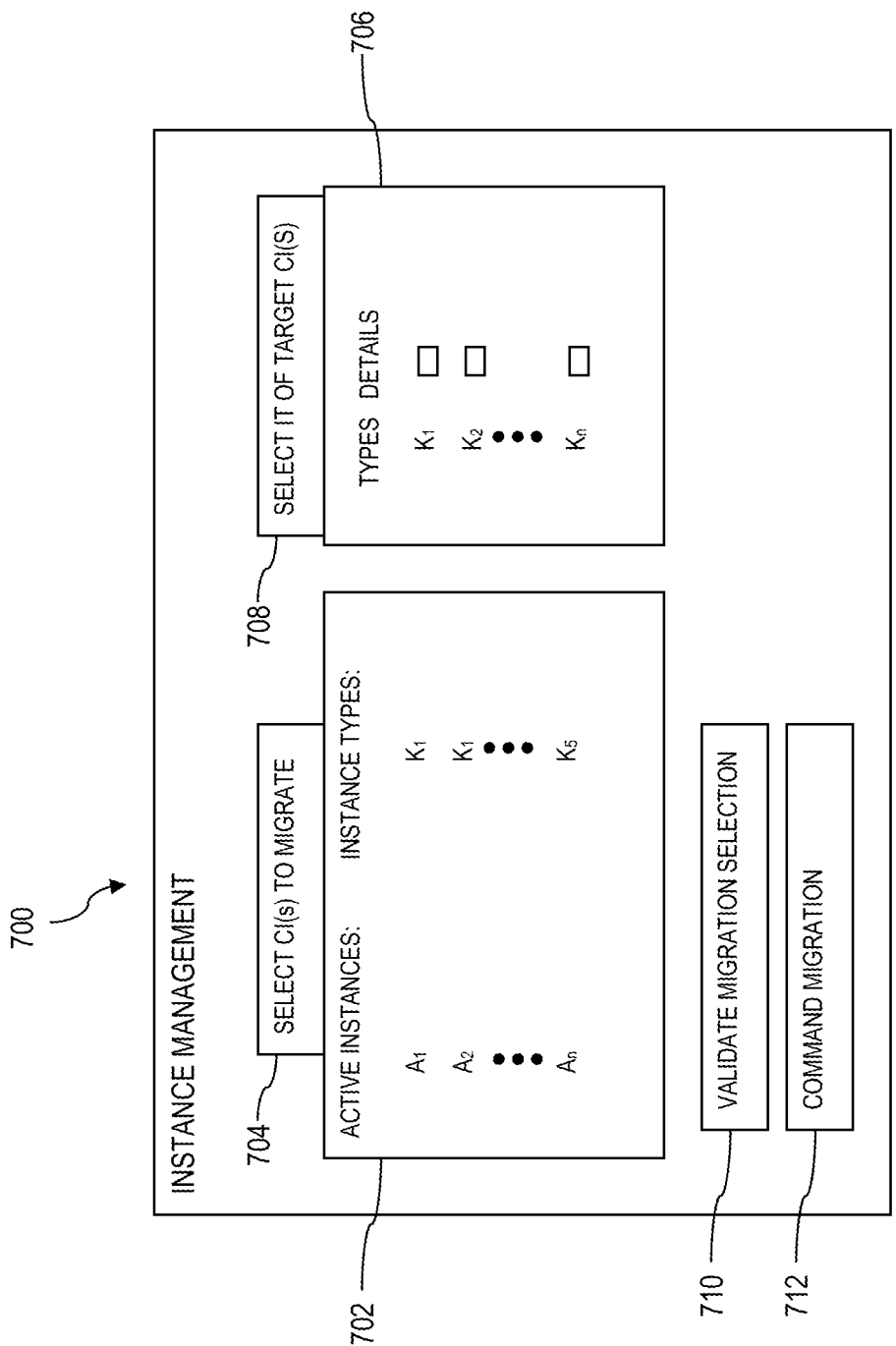
FIG. 6 shows a user interface for managing compute instance migration in accordance with various examples.

FIG. 6 shows an illustrative compute instance management UI screen 700. The screen 700 may be displayed on a work station operated by the client to provide the instance management UI 102. The UI 102 may be provided by an application that executes on a workstation or other computer in the client environment. Alternatively, the UI 102 may be provided in a web page on a browser of a workstation or other computer operated by the client, user, or customer. To access the functions for managing the compute instances of the client, the user may log in by providing a user identity, a password, and optionally further authorization tokens. The customer may request changing a first compute instance from a first compute instance type to a second compute instance type.

The screen 700 may present information about compute instances belonging to the client that execute on compute resources provided by the service provider and about alternative compute instance types that may be available for migrating compute instances to. The screen 700 presents a first window 702 listing active compute instances and the compute instance types of each compute instance. A first tab 704 provides a control to enable selection of one or more compute instances to migrate or change from a current compute instance type to a different compute instance type. Some clients may have a large number of compute instances executing at any given time that may be of the same compute instance types and/or of different compute instance types. The screen 700 may provide controls for migrating a plurality of compute instances based on a single command sequence to promote the efficiency and convenience of the client.

A second window 706 lists the different compute instance types supported by the system 100. Each instance type listed in the second window 706 may be associated with a selection button to command presentation of details of the corresponding compute instance type. The details may indicate the balance or mix among the type of compute resources as well as different sizes or scales (e.g., sub-types) of a compute instance type that may be selected. A second tab 704 provides a control to enable selection of a target compute instance type to which to migrate the one or more source compute instances selected in the first window 702. A validate migration selection button 710 may be selected by the client to command validation of the selected migration. Some migration sequences may not be supported. For example, migration from a later or upgrade compute instance type to an earlier or legacy compute instance type may not be allowed (e.g., may be deprecated). If a disallowed migration path is selected, the validation will fail. A command migration button 712 may be selected by the client to initiate or to commit the selected compute instance migration.

It is understood that the actual compute instance migration may not be executed immediately and may instead be scheduled for a later point in time, for example a point two weeks in the future. Under some circumstances, compute instance migration may be time consuming or may load compute resources of the service provider environment heavily, possibly degrading service for the client or other customers of the service provider. A scheduling service may consider other schedule compute instance migrations and/or historical service provider network loading trends in determining a recommended compute instance migration schedule. For example, the scheduling service may recommend compute instance migration in early morning hours during a weekend, for example from 2 AM to 4 AM on a Sunday morning.

In an embodiment, selection of the command migration button 712 may commit the compute instance migration and also cause a scheduling dialog box to display in the screen 700. The scheduling dialog may walk the client through a series of choices for scheduling the instance migration. This dialog may communicate back to the compute instance migration service 104 via the network 114 to coordinate with service provider technical support personnel and with compute resource availability to schedule the compute instance migration.

In an embodiment, the screen 700 may comprise further control and/or display features (not shown). The screen 700 may provide preference selections for target compute instance types. For example, a first client may wish to select a target compute instance type that uses a PV server image while a second client may wish to select the same target compute instance type to use a HVM server image. As another example, the first client may wish to select a target compute instance type that uses local block-based storage while a second client may wish to select the same target compute instance type to use a block-based storage.

Figure 7:
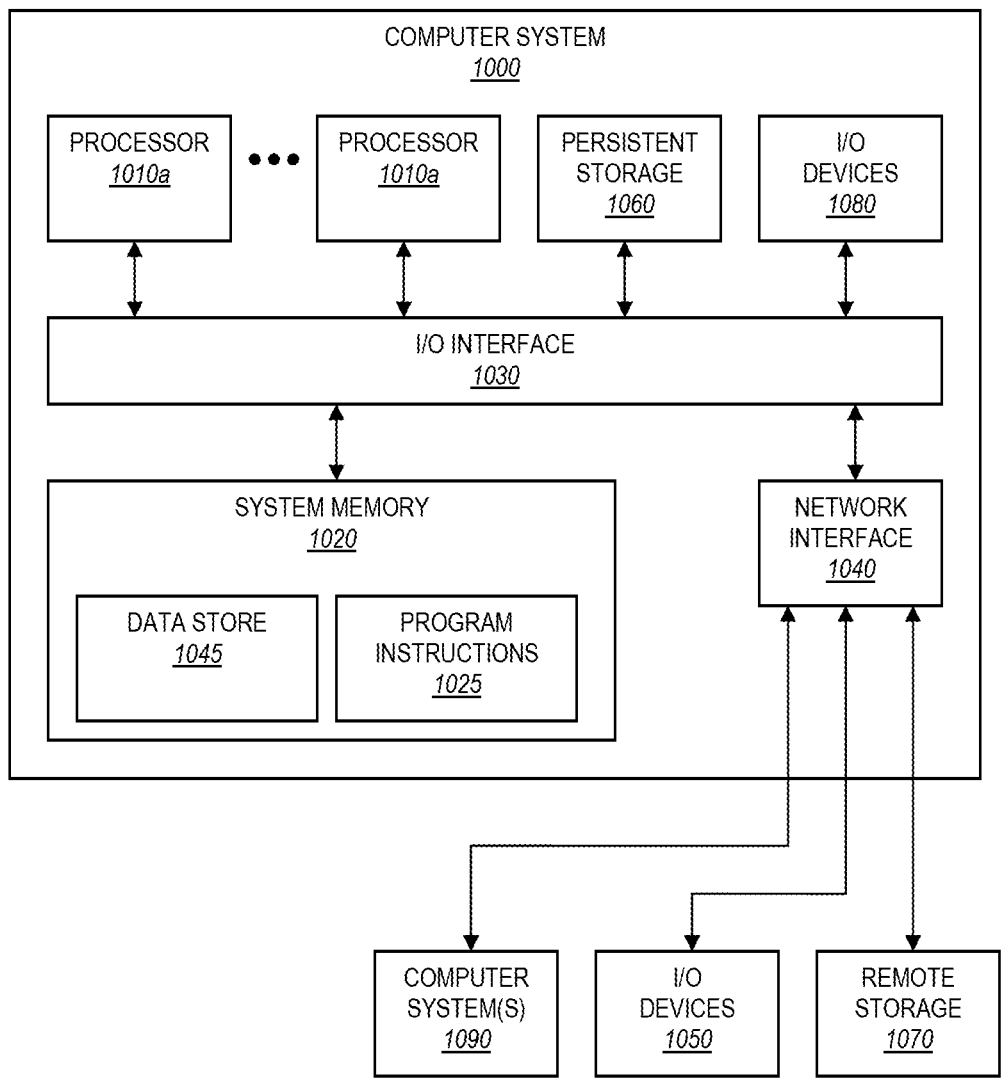
FIG. 7 shows a computer system in accordance with various examples.

FIG. 7 shows a computer system 1000 in accordance with one or more embodiments of the disclosure. Embodiments of migrating compute instances from a first instance type to compute instances of a second instance type as described herein may be executed on one or more computer systems, which may interact with various other devices. For example, the compute instance migration service 104 may execute on a computer system. The compute resources 108, 112 may be provided by one or more computer systems. The server image conversion service 302, the local block-based storage to block-based storage conversion service 304, and the compute instance conversion service 306 may be provided by one or more computer systems.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g., Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 (e.g., main memory) that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), RAMBUS RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as JAVA byte-code, or in any other language such as C/C++, JAVA, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components. In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Certain terms are used throughout the following description and claims to refer to particular system components. As one skilled in the art will appreciate, different companies may refer to a component by different names. For example, a virtual machine instance may be referred to alternatively as a virtual server instance, a computer instance may be referred to alternatively as a virtual server. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing instructions that when executed on a computing system cause the computing system to:
receive an input requesting that a first compute instance of a first compute instance type be instantiated as a second compute instance of a second compute instance type, where a mix of compute resources associated with the second compute instance type is different from a mix of compute resources associated with the first compute instance type;
convert a local block-based storage resource associated with the first compute instance to a virtualized non-local block-based storage resource associated with the second compute instance;
determine that the first compute instance type utilizes a paravirtualized (PV) server image;
determine that the second compute instance type mandates utilization of a hardware-assisted virtual machine (HVM) server image;
convert a PV server image associated with the first compute instance to a HVM server image associated with the second compute instance;
create the second compute instance of the second compute instance type based on the first compute instance, wherein creation of the second compute instance includes launching the second compute instance with a same operating system as the first compute instance, attaching a root partition of the first compute instance to the second compute instance, copying boot files to a directory of the second compute instance, and deactivate the second compute instance;
deactivate the first compute instance;
instantiate the HVM server image as the second compute instance, where the second compute instance is of the second compute instance type; and
attach the virtualized non-local block-based storage resource to the second compute instance.

2. The non-transitory computer-readable medium of claim 1, wherein the instructions that cause the computing system to convert the local block-based storage resource associated with the first compute instance to the virtualized non-local block-based storage resource associated with the second compute instance includes instructions that cause the computing system to:
determine that the first compute instance type utilizes local block-based storage;
determine that the second compute instance type utilizes block-based storage;
allocate a virtualized non-local block-based storage resource for the second compute instance;
copy data from a local block-based storage device utilized by the first compute instance to the block-based storage resource.

3. The non-transitory computer-readable medium of claim 1, wherein the mix of compute resources comprises processor hardware resources, random access memory (RAM) size resources, and storage size resources.

4. The non-transitory computer-readable medium of claim 1, wherein the input requesting that the first compute instance be instantiated as the second compute instance comprises requesting a plurality of first compute instances of the first compute instance type be instantiated as one or more second compute instances of the second compute instance type and wherein the instructions when executed on the computing system further cause the computing system to:
determine a number of second compute instances of the second compute instance type that provide service at least substantially equivalent to the service provided by the plurality of first compute instances of the first compute instance type, wherein the determined number of second computer instances is fewer in number than the plurality of first compute instances; and
instantiate the HVM server image as the determined number of second compute instances.

5. A system, comprising:
a computing node comprising a processor and a non-transitory memory; and
an application stored in the non-transitory memory that, when executed by the processor, causes the processor to:

receive an input requesting that a currently executing first compute instance of a first compute instance type be instantiated as a second compute instance of a second compute instance type, where a mix of compute resources associated with the second compute instance type is different from a mix of compute resources associated with the first compute instance type;

instantiate a third compute instance of the first compute instance type;

instantiate a fourth compute instance of the second compute instance type;

attach a root partition of the third compute instance to the fourth compute instance;

for the fourth compute instance, create a directory and mount the directory, stop the fourth compute instance, and detach the root partition from the third compute instance;

deactivate the first compute instance; and start the fourth compute instance as the requested second compute instance.

6. The system of claim 5, wherein the application further causes the processor to
determine that the first compute instance type utilizes local block-based storage;
determine that the second compute instance type utilizes virtualized non-local block-based storage;
allocate a virtualized non-local block-based storage resource for the second compute instance;
copy data from a local block-based storage device utilized by the first compute instance to the virtualized non-local block-based storage resource; and
attach the virtualized non-local block-based storage resource to the second compute instance.

7. The system of claim 5, where the application causes the processor to copy the data from the local block-based storage device to the virtualized non-local block-based storage resource after the first compute instance is deactivated.

8. The system of claim 5, where the application causes the processor to begin to copy data from the local block-based storage device to the virtualized non-local block-based storage resource before the first compute instance is deactivated.

9. The system of claim 8, wherein the first compute instance is configured to write new data into an already copied page of a local block-based storage device, the application marks the already copied page as uncopied, and the application causes the processor to copy the previously copied page containing the new data to the virtualized non-local block-based storage resource.

10. The system of claim 5, wherein the mix of compute resources differ based on an amount of random access memory (RAM), processor power, graphics processor availability in the compute instance types.

11. The system of claim 5, wherein the mix of compute resources differ based on support for burstable processing and an amount of input-output resource availability in the compute instance types.

12. The system of claim 5, wherein the first compute instance type is a deprecated legacy compute instance type and the second compute instance type is an upgrade compute instance type.

13. The system of claim 5, wherein the first compute instance and the second compute instance execute on compute resources provided by a computing environment of a service provider.

14. A method of migrating compute instances from an initial compute instance type to a subsequent compute instance type, where the subsequent compute instance type is different from the initial compute instance type, comprising:

receiving an input requesting that a first compute instance of a first compute instance type be instantiated as a second compute instance of a second compute instance type, where a mix of compute resources associated with the second compute instance type is different from a mix of compute resources associated with the first compute instance type;

converting a local block-based storage resource associated with the first compute instance to a virtualized non-local block-based storage resource associated with the second compute instance;

creating the second compute instance of the second compute instance type based on the first compute instance, wherein creating the second compute instance includes launching the second compute instance having a same operating system as the first compute instance, attaching a root partition of the first compute instance to the second compute instance, and copying boot files to a directory of the second compute instance, and stopping the second compute instance;

deactivating the first compute instance;

instantiating the second compute instance; and attaching the virtualized non-local block-based storage resource to the second compute instance.

15. The method of claim 14, wherein converting the local mass storage resource to the virtualized non-local block-based storage resource comprises:

determining that the first compute instance type utilizes local block-based storage;

determining that the second compute instance type utilizes virtualized non-local block-based storage;

allocating the virtualized non-local block-based storage resource for the second compute instance; and copying data from a local block-based storage device utilized by the first compute instance to the virtualized non-local block-based storage resource.

16. The method of claim 15, wherein copying data from the local block-based storage device to the virtualized non-local block-based storage device comprises:

attaching the virtualized non-local block-based storage resource to a worker thread of execution;

copying data by the worker thread of execution from the local block-based storage device to the virtualized non-local block-based storage resource; and before attaching the virtualized non-local block-based storage resource to the second compute instance, detaching the virtualized non-local block-based storage resource from the worker thread of execution.

17. The method of claim 15, wherein copying data from the local block-based storage device to the virtualized non-local block-based storage device comprises a synchronization process, where during the synchronization process data is copied from the local block-based storage device to the virtualized non-local block-based storage device while the first computer instance continues to write data to the local block-based storage device.

18. The method of claim 17, wherein the synchronization process comprises:

marking each of a plurality of pages of the local block-based storage device as uncopied;

copying pages marked uncopied from the local block-based storage device to the virtualized non-local block-based storage resource;

marking copied pages as copied;

writing new data into a page of the local block-based storage device that is marked copied; and remarking the page having new data written to it as uncopied.

19. The method claim 14, further comprising:

receiving an input requesting that a third compute instance of a first compute instance type be instantiated as a fourth compute instance of a third compute instance type, where a mix of compute resources associated with the third compute instance type is different from a mix of compute resources associated with the first compute instance type;

receiving an input requesting that the third compute instance utilize a PV server image;

determining that the third compute instance type mandates utilization of a hardware- assisted virtual machine (HVM) server image; and rejecting the request to instantiate the fourth compute instance of the third compute instance type.

20. The method of claim 14, further comprising:

determining that the first compute instance type utilizes a paravirtualized (PV) server image;

determining that the second compute instance type mandates utilization of a hardware-assisted virtual machine (HVM) server image;

converting a PV server image associated with the first compute instance to a HVM server image associated with the second compute instance;

wherein instantiating the second compute instance comprises instantiating the HVM server image as the second compute instance.

* * * * *